April 5, 1960 W. ZORN 2,931,591

REEL

Filed April 17, 1957

INVENTOR.

Werner Zorn

BY Michael S. Striker

Attorney

United States Patent Office 2,931,591

Patented Apr. 5, 1960

2,931,591

REEL

Werner Zorn, Berlin-Zehlendorf, Germany

Application April 17, 1957, Serial No. 653,384

Claims priority, application Germany November 13, 1951

16 Claims. (Cl. 242—74.2)

Figures 1, 2, 3, 4, 5:
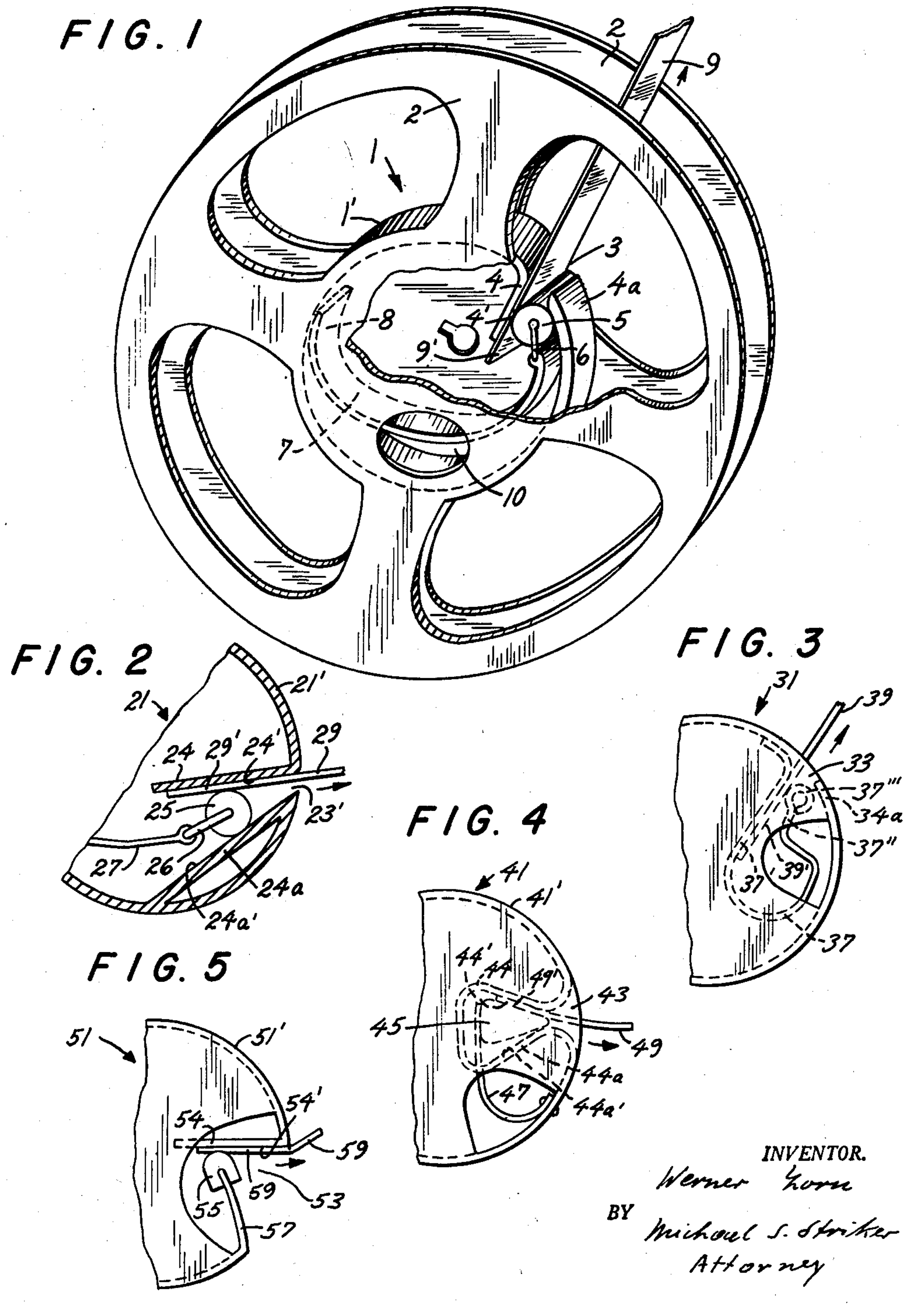

The present invention relates to reels.

More particularly, the present invention relates to a reel adapted to be used in a tape recorder or the like which is provided with an automatic reversing feature, and this application is a continuation-in-part of co-pending application Serial No. 319,635 filed November 10, 1952 now abandoned.

There exist tape recorders in which multiple tracks of a magnetic tape are used. In such recorders, the arrangement is normally such that as soon as all of the tape is unwound from the supply reel onto the take-up reel, the sense of rotation of the two reels is reversed and the supply becomes the take-up reel and the take-up reel becomes the supply reel. Consequently, a reel is required which is capable of retaining the tape at the instant the reel changes from a supply reel to a take-up reel and which does not permit the tape to become unfastened.

It is therefore an object of the present invention to provide a reel which fulfills the above requirements, i.e., a reel which firmly retains the end of a magnetic tape or the like.

It is another object of the present invention to provide a reel to which the end of a tape may readily be secured.

The objects of the present invention further include the provision of a reel which may be easily mass-produced at low cost.

With the above objects in view, the present invention mainly consists in a tape reel which comprises a reel body having a core portion formed in its periphery with opening means adapted to received the end of a tape, and clamping means on the reel body for clamping the end of a tape received in the opening means in such a manner that the clamping pressure exerted on the clamped end of the tape increases upon attempted withdrawal of the tape from the opening means.

More particularly, the reel includes a support which is arranged in the core portion and which has a face upon which the end of a tape received in the opening means may lie, and wedging means for wedging the end of a tape received in the opening means and lying on the face of the support in such a manner that the pressure exerted on the wedged end of the tape increases upon attempted withdrawal of the tape from the opening means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a perspective view of a reel according to the present invention, part of the center of one flange portion of the reel heaving been removed for purposes of illustration; and Figs. 2, 3, 4 and 5 are fragmentary views of the core portions of different embodiments of a reel according to the present invention.

Referring now to the drawing, and to Fig. 1 thereof in particular, there is shown a reel made of a suitable material, as for example, "Trolitul" or other transparent plastic, having a core portion 1 separating two flange portions 2. The material sold under the trademark "Trolitul" is a polystyrene or a styrene mixed polymerization product and is described in "Kunststoff-Taschenbuch" edited by Saechtling-Zebrewsky, 11th ed., published by R. I. Hauser Verlag, Munich, in 1955. The core portion is preferably hollow, and is formed in its periphery 1' with a slot or opening means 3 adapted to receive the end of a tape. The core portion is also formed with a support tongue 4, which may be integral with the peripheral portion 1', upon the face 4' of which tongue the end 9' of a tape 9 introduced through the slot 3 may lie:

A wedge element 5 is provided for clamping the tape end 9' against the face 4'. This element may be in the form of a cylinder made of resilient material, such as rubber. The wedge element 5 is carried by a leaf spring 7 and is connected to one end thereof by means of a yoke 6. The other end of the leaf spring is attached to the core portion at a point 8 located approximately diametrically opposite the slot 3. The leaf spring 7 constantly urges the wedge element 5 into engagement with the face 4'. Thus, before the tape end 9' is inserted through the slot 3, the wedge element 5 is raised off the face 4', manual accessibility to the spring 7 being afforded by way of opening means 10 formed in either or both flange portions 2.

The diameter of the wedge element 5 is such that when the tape 9 is sought to be withdrawn from the slot 3 in the direction of the arrow, the element 5 will be wedged between the support 4 and that portion of the core periphery 1' which is indicated at 4*a*. In this way, the pressure exerted on the tape end 9' increases upon attempted withdrawal of the tape from the slot.

If desired, the tape end 9' can be inserted between the wedge element 5 and the inner face of the periphery portion 4*a*, in lieu of between the element 5 and the face 4' of the support tongue 4.

The embodiment shown in Fig. 2 is similar to that shown in Fig. 1 in that the periphery 21' of the core portion 21 is slotted at 23', and in that the tape end 29' of a tape 29 is pressed against the face 24' of a support tongue 24 by means of a wedge element 25 connected to one end of a leaf spring 27 by a yoke 26. The embodiment of Fig. 2 differs from that of Fig. 1 in that the core portion is formed with a second support 24*a* which is a chord passing through the core portion 21. The support 24*a*, which may be integral with the periphery 21,' has a face 24*a'* which is opposite the face 24*a*, and the faces are spaced from each other and converge toward each other in that direction in which the tape 29 is moved upon withdrawal from the slot 23. Thus, the wedge element 25 will be wedged between the faces 24' and 24*a'* upon attempted withdrawal of the tape 29, thereby increasing the pressure upon the tape end 29'.

In the embodiment shown in Fig. 3 the leaf spring 37 is attached at one end to the periphery 31' of the core portion 31 in the region of the slot 33, and an intermediate portion 37' of the spring constitutes the support upon which the end 39' of the tape 39 lies. The other end portion 37'' of the spring is bent upon the intermediate portion 37' and forms a wedge element 37''' which is wedged between the faces of the intermediate portion 37' and the periphery portion 34*a* when the tape 39 is sought to be withdrawn from the slot 33.

If desired, the wedge element 37''' may, instead of being an integral portion of the leaf spring 37, be a separate element, as, for example, a rubber cylinder of the type incorporated in the reels illustrated in Figs. 1 and 2.

In the embodiment shown in Fig. 4, the slot 43 in the periphery 41' of the core portion 41 is substantially triangular in shape with the apex pointing toward the periphery. The end 49' of the tape 49 may lie upon either the face 44' of the support 44 or the face 44a' of the support 44a, and a substantially triangular wedging element 45 carried by a leaf spring 47 serves to press the tape end 49' against the one of the two faces. Thus, the wedging element 45 will be wedged between the faces 44' and 44a' upon attempted withdrawal of the tape 49 from the slot 43.

As is clearly shown in Fig. 4, the supports 44 and 44a are in the form of tongues integral with the periphery 41', and a suitable connecting portion 44b may be provided for maintaining the continuity between the periphery 41 and the tongues 44 and 44a. However, the continuous wall formed by the tongue 44, the connection portion 44b and the tongue 44a is suitably slotted so that the spring 47 may project into the slot 43.

In the embodiment shown in Fig. 5 the periphery 51' of the core portion 51 is formed with a support tongue 54 upon the face 54' of which the end 59' of a tape 59 lies. The wedging means include a leaf spring 57 which may be integral with the periphery 51 and which has an end portion or carries a wedging element 55 that is constantly urged against the face 54', thereby pressing the tape end 59' against this face. The leaf spring 57 is so arranged that when the free end portion, or the wedging element 55 carried thereby, abuts the tape end 59' lying on the face 54', the leaf spring is inclined to and converges toward the face 54' in a direction opposite to that in which the tape 59 is moved upon withdrawal, i.e., the angle between the leaf spring 57 and the direction in which the tape 59' is pulled during withdrawal from the slot 53 is less than a right angle. Consequently, the tape end 59' will be wedged during attempted withdrawal of the tape from the slot.

It will be understood that each of the elements described above, or two or more together, may also find a useful application in other types of reels differing from the types described above.

While the invention has been illustrated and described as embodied in a reel for magnetic tape, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A tape reel comprising, in combination, a reel body having a core portion formed in its periphery with opening means adapted to receive the end of a tape; wedging means mounted on said core portion of said reel body for movement between non-wedging and wedging position for wedging the end of a tape received in said opening means in such a manner that the pressure exerted on the wedged end of the tape increases upon attempted withdrawal of the tape from said opening means, said wedging means being constructed and arranged so as to be accessible from outside of said reel and manually movable from wedging to non-wedging position; and spring means mounted on said core portion of said reel body for urging said wedging means into said wedging position.

2. A tape reel comprising, in combination, a reel body having a core portion formed in its periphery with opening means adapted to receive the end of a tape; a support arranged in said core portion of said reel body and having a face upon which the end of a tape received in said opening means may lie; wedging means mounted for wedging the end of a tape received in said opening means and lying on said face of said support in such a manner that the pressure exerted on the wedged end of the tape increases upon attempted withdrawal of the tape from said opening means, said wedging means being constructed and arranged so as to be accessible from outside of said reel and manually movable from wedging to non-wedging positions relative to said face; and spring means mounted on said core portion of said reel body for urging said wedging means into said wedging position.

3. A tape reel comprising, in combination, a reel body having a core portion formed in its periphery with opening means adapted to receive the end of a tape; a support integral with said core portion of said reel body and having a face upon which the end of a tape received in said opening means may lie; wedging means for wedging the end of a tape received in said opening means and lying on said face of said support in such a manner that the pressure exerted on the wedged end of the tape increases upon attempted withdrawal of the tape from said opening means, said wedging means being constructed and arranged so as to be accessible from outside of said reel and manually movable from wedging to non-wedging position relative to said face; and spring means mounted on said core portion of said reel body for urging said wedging means into said wedging position.

4. A tape reel comprising, in combination, a reel body having a core portion formed in its periphery with opening means adapted to receive the end of a tape; a first support arranged in said core portion of said reel body and having a first face upon which the end of a tape received in said opening means may lie; and wedging means for wedging the end of a tape received in said opening means and lying on said first face of said first support in such a manner that the pressure exerted on the wedged end of the tape increases upon attempted withdrawal of the tape from said opening means, said wedging means including a second support arranged in said core portion of said reel body and having a second face opposite said first face, said faces being spaced from each other and converging toward each other in that direction in which the tape is moved upon withdrawal from said opening means, and a wedge element arranged between said first and second faces and being so dimensioned as to be wedged between the same upon movement in said direction, whereby the end of a tape received in said opening means and lying on said first face of said first support is clamped between said first face and said wedge element, and the latter, during attempted withdrawal of the tape from said opening means, is wedged between said first and second faces thereby increasing the pressure upon the end of the tape, said wedging means being constructed and arranged so as to be accessible from outside of said reel and manually movable from wedging to non-wedging position relative to said faces.

5. A tape reel comprising, in combination, a reel body having a core portion formed in its periphery with opening means adapted to receive the end of a tape; a first support arranged in said core portion of said reel body and having a first face upon which the end of a tape received in said opening means may lie; a second support arranged in said core portion of said reel body and having a second face opposite said first face, said faces being spaced from each other and converging toward each other in that direction in which a tape received in said opening means is withdrawn therefrom; and a wedge element arranged between said first and second faces for movement between non-wedging and wedging positions and being so dimensioned as to be wedged between the same upon movement in said direction, whereby the end of a tape received in said opening means and lying on said first face of said first support is clamped between said first face and said wedge element, and the latter, during attempted withdrawal of the tape from said opening means, is wedged between said first and second faces thereby increasing the pressure upon the end of the tape.

6. A tape reel comprising, in combination, a reel body having a core portion formed in its periphery with opening means adapted to receive the end of a tape; a first support integral with said core portion of said reel body and having a first face upon which the end of a tape received in said opening means may lie; a second support integral with said core portion of said reel body and having a second face opposite said first face, said faces being spaced from each other and converging toward each other in that direction in which a tape received in said opening means is withdrawn therefrom; and a wedge element arranged between said first and second faces and being so dimensioned as to be wedged between the same upon movement in said direction, whereby the end of a tape received in said opening means and lying on said first face of said first support is clamped between said first face and said wedge element, and the latter, during attempted withdrawal of the tape from said opening means, is wedged between said first and second faces thereby increasing the pressure upon the end of the tape.

7. A tape reel comprising, in combination, a reel body having a core portion formed in its periphery with opening means adapted to receive the end of a tape; a first support integral with said core portion of said reel body and having a first face upon which the end of a tape received in said opening means may lie; a second support integral with said core portion of said reel body and having a second face opposite said first face, said faces being spaced from each other and converging toward each other in that direction in which a tape received in said opening means is withdrawn therefrom; and a substantially cylindrical wedge element arranged between said first and second faces and being so dimensioned as to be wedged between the same upon movement in said direction, whereby the end of a tape received in said opening means and lying on said first face of said first support is clamped between said first face and said wedge element, and the latter, during attempted withdrawal of the tape from said opening means, is wedged between said first and second faces thereby increasing the pressure upon the end of the tape.

8. A tape reel comprising, in combination, a reel body having a core portion formed in its periphery with opening means adapted to receive the end of a tape; a first support integral with said core portion of said reel body and having a first face upon which the end of a tape received in said opening means may lie; a second support integral with said core portion of said reel body and having a second face opposite said first face, said faces being spaced from each other and converging toward each other in that direction in which a tape received in said opening means is withdrawn therefrom; and a substantially triangular wedge element arranged between said first and second faces and being so dimensioned as to be wedged between the same upon movement in said direction, whereby the end of a tape received in said opening means and lying on said first face of said first support is clamped between said first face and said wedge element, and the latter, during attempted withdrawal of the tape from said opening means, is wedged between said first and second faces thereby increasing the pressure upon the end of the tape.

9. A tape reel comprising, in combination, a reel body having a core portion formed in its periphery with opening means adapted to receive the end of a tape; a first support integral with said core portion of said reel body and having a first face upon which the end of a tape received in said opening means may lie; a second support integral with said core portion of said reel body and having a second face opposite said first face, said faces being spaced from each other and converging toward each other in that direction in which a tape received in said opening means is withdrawn therefrom; and a wedge element made of resilient material arranged between said first and second faces and being so dimensioned as to be wedged between the same upon movement in said direction, whereby the end of a tape received in said opening means and lying on said first face of said first support is clamped between said first face and said wedge element, and the latter, during attempted withdrawal of the tape from said opening means, is wedged between said first and second faces thereby increasing the pressure upon the end of the tape.

10. A tape reel comprising, in combination, a reel body having a core portion formed in its periphery with opening means adapted to receive the end of a tape; a first support integral with said core portion of said reel body and having a first face upon which the end of a tape received in said opening means may lie; a second support integral with said core portion of said reel body and having a second face opposite said first face, said faces being spaced from each other and converging toward each other in that direction in which a tape received in said opening means is withdrawn therefrom; a wedge element arranged between said first and second faces and being so dimensioned as to be wedged between the same upon movement in said direction, whereby the end of a tape received in said opening means and lying on said first face of said first support is clamped between said first face and said wedge element, and the latter, during attempted withdrawal of the tape from said opening means, is wedged between said first and second faces thereby increasing the pressure upon the end of the tape and carrier means connected at one end thereof to said core portion of said reel body and connected at the other end to said wedge element, said carrier means being so constructed and arranged that said wedge element is normally located in the space between said first and second faces, clamping said tape against said first face and movable into and out of engagement relative to said faces.

11. A tape reel comprising, in combination, a reel body having a core portion formed in its periphery with opening means adapted to receive the end of a tape; a first support integral with said core portion of said reel body and having a first face upon which the end of a tape received in said opening means may lie; a second support integral with said core portion of said reel body and having a second face opposite said first face, said faces being spaced from each other and converging toward each other in that direction in which a tape received in said opening means is withdrawn therefrom; a wedge element arranged between said first and second faces and being so dimensioned as to be wedged between the same upon movement in said direction, whereby the end of a tape received in said opening means and lying on said first face of said first support is clamped between said first face and said wedge element, and the latter, during attempted withdrawal of the tape from said opening means, is wedged between said first and second faces thereby increasing the pressure upon the end of the tape and leaf spring means connected at one end thereof to said core portion of said reel body and connected at the other end to said wedge element, said leaf spring means being so constructed and arranged that said wedge element is normally located in the space between said first and second faces and is constantly urged into engagement with said first face, and movable into and out of wedging engagement with said faces.

12. The combination defined in claim 11 wherein said core portion of said reel body is formed with additional opening means for providing manual access therethrough to said leaf spring means, thereby permitting such manipulation thereof as will move said wedge element away from said first face so as to permit the placement of said end onto said first face.

13. A tape reel comprising, in combination, a reel body having a core portion formed in its periphery with a slot formed to provide a pair of wedging faces through which the end of a tape may be inserted into the interior of said core portion; and wedging means for pressing the introduced tape end toward one of said faces for wedging the tape end against said face in such a manner that the pressure on the tape end increases upon attempted withdrawal of the tape from said slot, said wedging means being constructed and arranged so as to be accessible from outside of said reel and manually movable from wedging to non-wedging position relative to said face.

14. The combination defined in claim 5 wherein said first support and said wedge element are constituted by a leaf spring one end portion of which spring is attached to said core portion of said reel body in the region of said opening means, an intermediate portion of which leaf spring forms said first support, and the opposite end portion of which leaf spring is bent upon said intermediate portion and forms said wedge element.

15. A tape reel comprising, in combination, a reel body having a core portion formed in its periphery with opening means adapted to receive the end of a tape; a support arranged in said core portion of said reel body and having a face upon which the end of a tape received in said opening means may lie; and wedging means for wedging the end of a tape received in said opening means and lying on said face of said support in such a manner that the pressure exerted on the wedged end of the tape increases upon attempted withdrawal of the tape from said opening means, said wedging means including leaf spring means having an end portion constantly urged toward said face of said support, said leaf spring means being so arranged that when said end portion of said leaf spring means abuts a tape lying on said face said leaf spring means is inclined to and converges toward said face in a direction opposite to that in which the tape is moved upon withdrawal.

16. A tape reel comprising, in combination, a reel body having a core portion formed in its periphery with opening means adapted to receive the end of a tape; a support arranged in said core portion of said reel body and having a face upon which the end of a tape received in said opening means may lie; and wedging means for wedging the end of a tape received in said opening means and lying on said face of said support in such a manner that the pressure exerted on the wedged end of the tape increases upon attempted withdrawal of the tape from said opening means, said wedging means including leaf spring means integral with said core portion of said reel body and having an end portion constantly urged toward said face of said support, said leaf spring means being so arranged that when said end portion of said leaf spring means abuts a tape lying on said face said leaf spring means is inclined to and converges toward said face in a direction opposite to that in which the tape is moved upon withdrawal.

References Cited in the file of this patent

UNITED STATES PATENTS

| | | |
|---|---|---|
| 1,578,894 | Joy | Mar. 30, 1926 |
| 2,373,704 | Obolensky | Apr. 17, 1945 |
| 2,484,100 | Kramer | Oct. 11, 1949 |
| 2,542,186 | Fulop | Feb. 20, 1951 |
| 2,638,284 | Rahfuse | May 12, 1953 |

FOREIGN PATENTS

| | | |
|---|---|---|
| 637,371 | Great Britain | May 17, 1950 |